United States Patent [19]

Woiceshyn

[11] Patent Number: 5,593,766

[45] Date of Patent: Jan. 14, 1997

[54] COMPOSITE FOR REINFORCING BITUMINOUS ROOFING MEMBRANES INCLUDING A LIGHTWEIGHT GRID OF OVER-UNDER CONSTRUCTION

[75] Inventor: D. Mark Woiceshyn, St. Catharines, Canada

[73] Assignee: Bay Mills Limited, St. Catharines, Canada

[21] Appl. No.: 470,481

[22] Filed: Jun. 6, 1995

Related U.S. Application Data

[62] Division of Ser. No. 230,813, Apr. 21, 1994, Pat. No. 5,439,726, which is a division of Ser. No. 77,404, Jun. 16, 1993, Pat. No. 5,314,556, which is a continuation of Ser. No. 860,196, Mar. 26, 1992, abandoned, which is a continuation of Ser. No. 520,770, May 8, 1990, abandoned.

[51] Int. Cl.$^6$ ................................................ B32B 5/12
[52] U.S. Cl. ................ 428/236; 428/107; 428/109; 428/110; 428/105; 428/114; 428/232; 428/247
[58] Field of Search .......................... 428/109, 107, 428/110, 105, 114, 115, 232, 236, 282, 252, 247

[56] References Cited

U.S. PATENT DOCUMENTS

| | | | |
|---|---|---|---|
| 2,919,217 | 12/1959 | Bobkowicz | 428/302 |
| 3,390,439 | 7/1968 | Kalwaites | 156/439 |
| 3,479,244 | 11/1969 | Burnett | 428/114 |
| 3,674,583 | 7/1972 | Allport | 156/179 |
| 3,728,195 | 4/1973 | Bolles | 156/441 |
| 3,843,579 | 10/1974 | Eanzel | 260/29.6 F |
| 3,867,242 | 2/1975 | Miller | 428/114 |
| 3,940,534 | 2/1976 | Fick et al. | 428/228 |
| 3,993,828 | 11/1976 | McCorsley, III | 428/236 |
| 4,107,371 | 8/1978 | Dean | 428/255 |
| 4,230,762 | 10/1980 | Iwasaki et al. | 428/287 |
| 4,248,650 | 2/1981 | Murro | 156/181 |
| 4,324,453 | 4/1982 | Patel | 350/96.23 |
| 4,368,228 | 1/1983 | Gorgati | 428/110 |
| 4,388,364 | 6/1983 | Sanders | 428/253 |
| 4,454,184 | 6/1984 | Britton | 428/295 |
| 4,460,633 | 7/1984 | Kobayashi et al. | 428/110 |
| 4,491,617 | 1/1985 | O'Connor et al. | 428/236 |
| 4,518,640 | 5/1985 | Wilkens | 428/102 |
| 4,539,254 | 9/1985 | O'Connor et al. | 428/236 |
| 4,540,311 | 9/1985 | Leach | 404/72 |
| 4,615,934 | 10/1986 | Ellison | 428/254 |
| 4,617,229 | 10/1986 | Larsson et al. | 428/284 |
| 4,755,423 | 7/1988 | Greiser et al. | 428/284 |
| 4,762,744 | 8/1988 | Woiceshyn et al. | 428/219 |

(List continued on next page.)

FOREIGN PATENT DOCUMENTS 670012 9/1963 Canada .

*Primary Examiner*—Kathleen Choi
*Attorney, Agent, or Firm*—Fitzpatrick, Cella, Harper & Scinto

[57] ABSTRACT

A puncture resisting and processability improving composite for reinforcing bituminous roofing membranes that are free of organic mats. The composite includes a lightweight open grid of over-under construction, the grid having polyester yarns of about 30 to about 300 denier in the machine direction and about 30 to about 300 denier in the cross-machine direction, a yarns per inch count of about 3×3 to about 10×10 in each of the machine and cross-machine directions, and a dry weight pick-up of about 60 to about 250 parts of binder to 100 parts by weight of polyester in the grid, in which an adhesive that is one of dissolved and dispersed in a liquid is applied to the composite so that the open grid is held together by the adhesive alone. The composite also includes a high strength reinforcing fabric consisting essentially of a non-woven open grid of polyester having no mechanical connections at cross-over points in the grid, which is combined with the adhesively secured lightweight polyester open grid. The lightweight grid and the high strength reinforcing fabric are so arranged and constructed as to have sufficient binder and surface area to hold high strength grids inside bituminous material of a roofing membrane during manufacture of the roofing membrane and to provide a roofing membrane that is free of any organic mat.

20 Claims, 3 Drawing Sheets

U.S. PATENT DOCUMENTS

| | | | |
|---|---|---|---|
| 4,780,350 | 10/1988 | O'Connor et al. | 428/109 |
| 4,871,605 | 10/1989 | Pagen et al. | 428/141 |
| 4,879,163 | 11/1989 | Woiceshyn | 428/198 |
| 5,057,172 | 10/1991 | Woiceshyn | 156/148 |
| 5,070,540 | 12/1991 | Bettcher et al. | 2/2.5 |
| 5,116,682 | 5/1992 | Chakravarti et al. | 428/395 |

000
COMPOSITE FOR REINFORCING BITUMINOUS ROOFING MEMBRANES INCLUDING A LIGHTWEIGHT GRID OF OVER-UNDER CONSTRUCTION

This application is a divisional of application Ser. No. 08/230,813, filed Apr. 21, 1994, which is now U.S. Pat. No. 5,439,926, which application is a divisional of application Ser. No. 08/077,404, filed Jun. 16, 1993, now U.S. Pat. No. 5,314,556, which application is a continuation of prior application Ser. No. 07/860,196, filed Mar. 26, 1992, which application is a continuation of prior application Ser. No. 07/520,770, filed May 8, 1990, both now abandoned.

This invention relates to roofing membranes made from asphalt or other bituminous material. The invention comprises a process for making reinforced roofing membranes and a reinforcing layer for roofing membranes.

BACKGROUND OF THE INVENTION

For a long time roofing membranes were made from organic felts saturated with bituminous materials such as asphalt or modified bitumen. For several years, those membranes have been improved by adding polyester or fiberglass open grids for strength and fiberglass mats for dimensional stability. See, for example, commonly assigned U.S. Pat. Nos. 4,491,617 and 4,539,254.

In this art, it is still generally believed necessary, even with the improved high strength grids, to continue to utilize during manufacture and retain in the final product an organic felt or mat of some kind, such as a polyester mat, to provide adhesion of bitumen to the reinforcing elements, to increase stiffness, to increase bulk, and to provide toughness to resist punctures. In addition, during processing in vats of high temperature bituminous material, such mats hold the grids of the high strength reinforcing elements in place and together inside the bituminous material. For example, without a polyester mat, a high-strength polyester scrim used for reinforcing comes apart in the vat of hot bituminous material during manufacture of the roofing membrane. In addition, high strength grids manufactured without a polyester mat to hold them together have a tendency to "pull-out" from the fiberglass mat and come to the surface of the roofing membrane. This occurs while the membrane is being coated with bituminous material or during the cooling stages. It is desirable, however, that the polyester grid remain embedded inside the bitumen.

As an example, one current reinforcement for roofing membranes comprises a heavy polyester, open-grid scrim (2.67×2.67 yarns per inch, 1000 denier, about 2.0 ounces per square yard) laminated to a lightweight polyester mat (0.5 ounce per square yard, about 17 grams per square meter). This polyester grid/mat product is led with a fiberglass mat (3.75 ounces per square yard) through a vat of bituminous material to create a roofing membrane coated on both sides with bituminous material. During processing the polyester grid is sandwiched between the two mats. One purpose of the polyester mat during this processing is to hold the polyester grid yarns against the fiberglass mat. Without such a lightweight polyester mat, the polyester grid, which is held together with a thermoplastic adhesive (without any mechanical fastening at the cross-overs of the grid), would have a tendency to come apart and/or pull out to the surface of the membrane during impregnation with hot bituminous material.

A problem with this roofing membrane, however, is delamination of the top and bottom bituminous layers in the final product. While the porosity of the lightweight polyester mat is high and saturates rapidly, the polyester mat does not allow the bituminous layers on either side of it to adhere to each other to a great degree. One method used to reduce this problem is to go to the extra step of needle-punching holes in such mats to promote saturation and adhesion, but this added manufacturing step requires additional expense.

Accordingly, a need exists to overcome the above noted drawbacks and produce better and more economical products.

SUMMARY OF THE PRESENT INVENTION

In the process of the present invention, a roofing membrane is made by selecting a lightweight polyester fabric that consists essentially of a lightweight non-woven open grid of an over-under construction scrim. Surprisingly, this fabric may replace the organic, polyester mats previously used and has advantages of cost and performance over such mats.

The finished roofing membrane product of this invention has much improved resistance to delamination, which has been demonstrated dramatically at lap joints that are formed in a roof when the final product is installed. Because of increased strength between the layers, the lap joint strength increases considerably. This is important since a great many roof failures occur because of weak lap joints.

DESCRIPTION OF THE PREFERRED EMBODIMENTS

As used herein, "over-under construction" refers to a non-woven fabric 1 in which yarns 2 in the cross-machine direction (the "fill" yarns) are held between pairs of yarns 3 in the machine direction. The pairs of yarns in the machine direction are essentially one above the other, and the fill yarns pass between the yarns in the pair. Thus, the upper machine-direction yarns lie in one plane, the lower machine direction yarns lie in a second plane, and the fill yarns lie between them in an intermediate plane. Therefore, wherever a fill yarn crosses a pair of machine-direction yarns, one machine-direction yarn is over, and one machine-direction yarn is under, the fill yarn. Such non-woven fabrics may typically be held together by adhesives 4.

Figure 1:
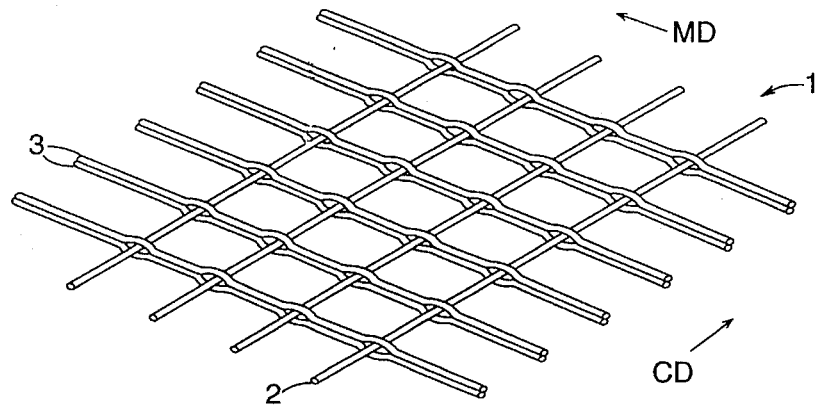
FIG. 1 represents in perspective a lightweight non-woven open grid of an over-under construction scrim. "MD" and its associated arrow in this and other Figures refers to "machine direction" or warp direction, and "CD" and its associated arrow refer to "cross-machine direction" or weft direction.
Figure 2:
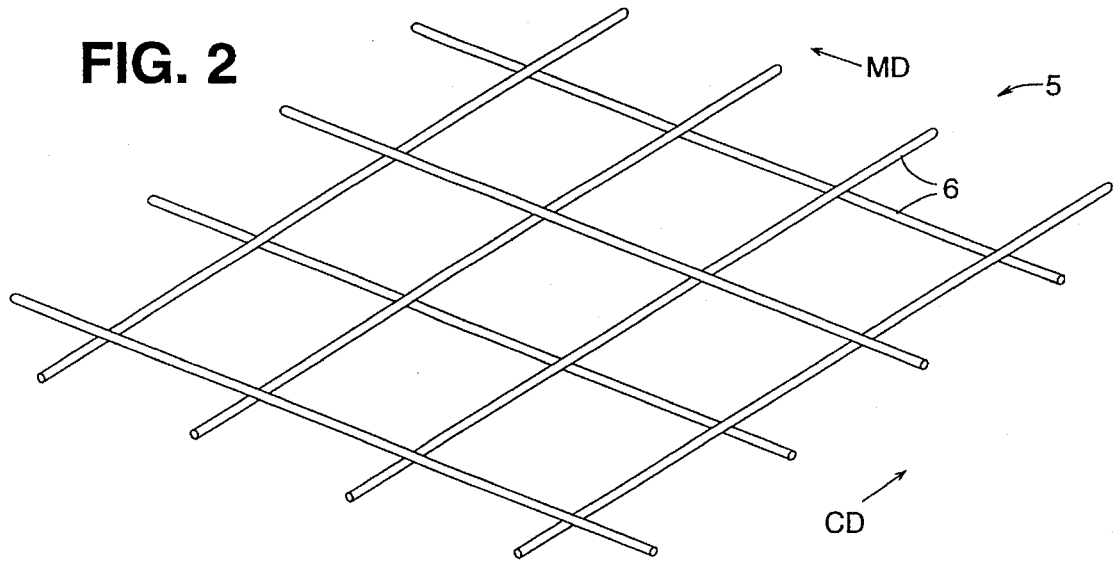
FIG. 2 represents in perspective a high strength, open grid reinforcing fabric.
Figure 3:
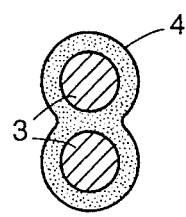
FIG. 3 represents in cross section two of the machine direction filaments of the grid of FIG. 1 and adhesive surrounding them.
Figure 4:
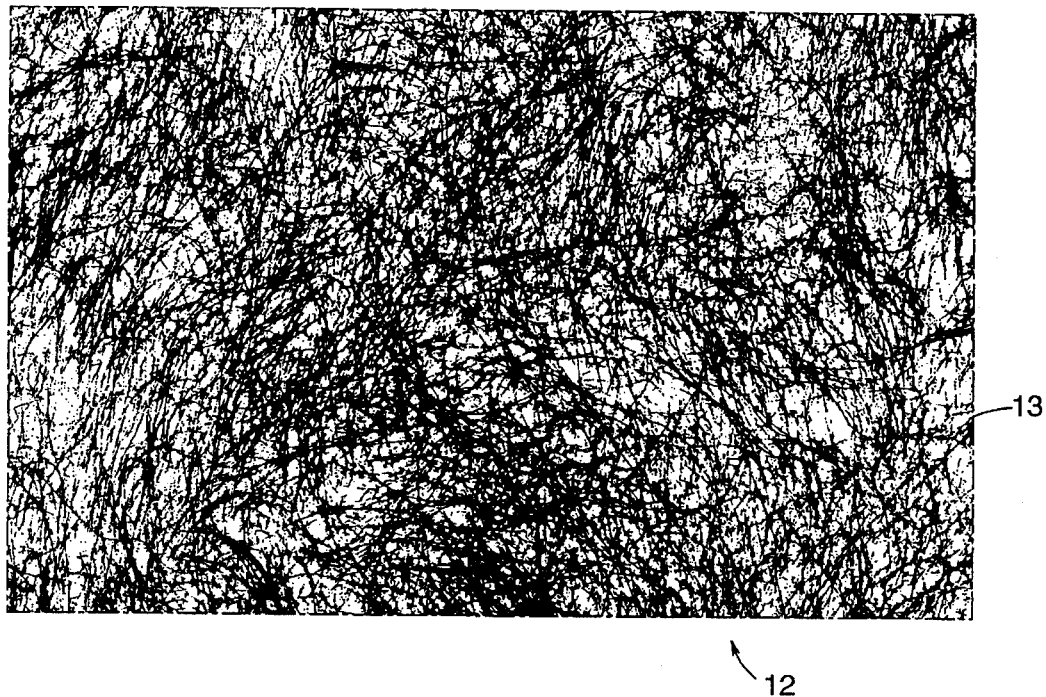
FIG. 4 represents a mat of entangled filaments.
Figure 5:
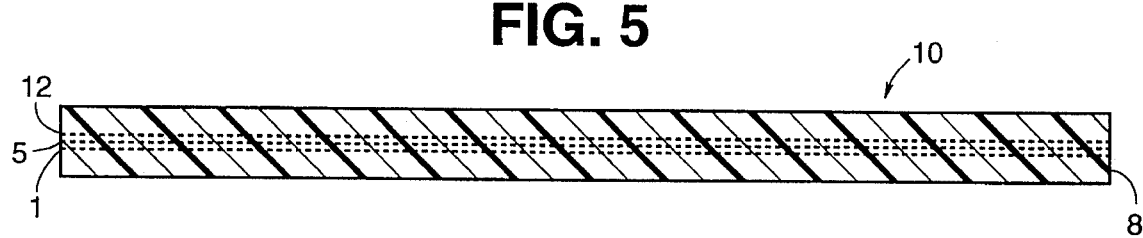
FIG. 5 represents schematically a roofing membrane consisting of three reinforcing layers embedded in a bituminous material.

Because of their over-under construction, the machine-direction yarns can hold high quantities of adhesive: the adhesive accumulates between the two yarns in each pair and binds them together well, holding the fill yarns securely between them, or presented in FIG. 3. This reduces the tendency of the lightweight non-woven polyester fabric, which has no mechanical connection at the cross-over points, to come apart during processing.

The process of this invention further comprises combining the above over-under fabric with a high strength, open grid reinforcing fabric 5, preferably a non-woven fabric of high tenacity polyester 6 without mechanical connections at its yarn cross-over points. In accordance with this invention, the lightweight over-under grid and the high strength grid may then be led through a vat 7 in FIG. 6 of hot bituminous material 8, without any organic felt or polyester mat. As in prior processes, appropriate rollers 9 or doctor blades 14 are used, and the bituminous material coats the grids and forms a roofing membrane. The grids do not come apart in the hot vat and the high strength grid does not pull out of or come to the surface of the membrane 10. In addition, the final product has a reduced tendency to delaminate.

Figure 6:
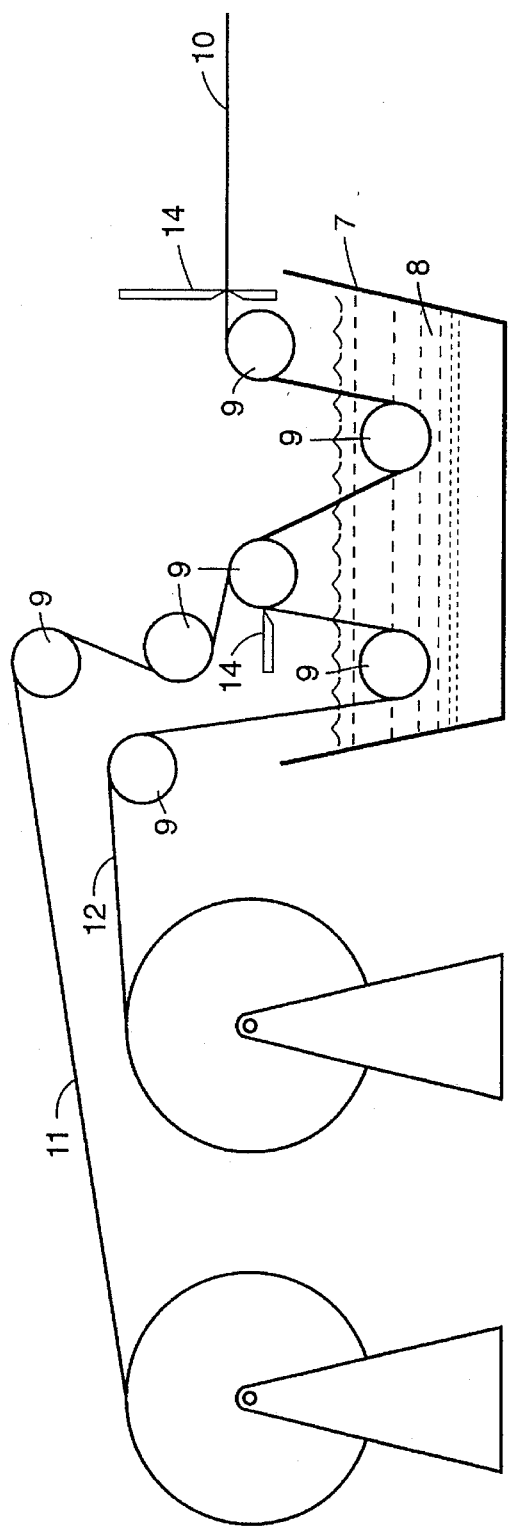
FIG. 6 represents schematically the process of manufacturing a roofing membrane such as the one represented in FIG. 5 by combining reinforcing fabrics, which are unwound from rolls mounted on stands, and passing them through a vat of bituminous material.
Figure 7:
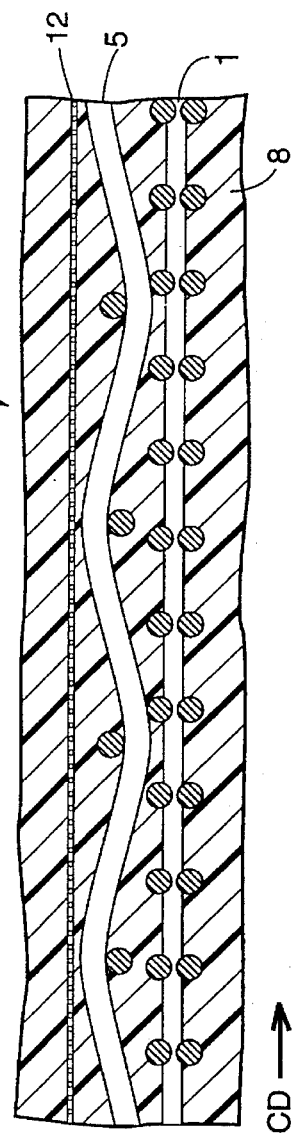
FIG. 7 is an enlarged cross section of a portion of the fabric shown in FIG. 5. This and the other figures are intended to represent clearly features of the present invention, but they are somewhat schematic and are not necessarily drawn to scale.

The process of the present invention may also comprise laminating the above two layers—the high strength, open grid reinforcing fabric 5 and the light weight over-under non-woven polyester fabric 1—together under heat and pressure to create a single fabric 11 before leading them through the bituminous material with a third fabric, preferably a fiberglass mat 12, as shown in FIG. 6. The process may also comprise laminating all three layers together before leading them through the bituminous material. In addition, the invention may comprise combining the lightweight over-under fabric, the high strength fabric and a fiberglass mat with a fourth or more layers of fabric before leading them through the bituminous material.

As used herein "mat" 12 refers to an entangled mass of filaments. These filaments 13 may be either staple filaments of lengths preferably above 25 millimeters (one inch) or continuous filaments. The filaments may be held together by adhesives, binders, finishes, felting, or by the melting under heat and pressure of certain thermoplastic filaments in the mat. A typical polyester mat of the prior art, which the lightweight polyester open grid of the present invention replaces, is known in the trade as "Reemay." As used in roofing membrane construction, lightweight polyester mats are typically much less porous than fiberglass mats, and hence, two layers of bituminous material bind together through fiberglass mats with a much stronger bond than through a lightweight polyester mat. "Mechanically fastened at yarn crossover points" refers to fabrics made by processes such as conventional weaving or weft-inserted warp-knit fabrics, in which knitting yarns are used to hold crossing yarns together.

In the over-under fabric of the present invention we prefer to use polyester yarns 3 having from about 30 to about 300 denier in the fill or cross-machine direction and from about 30 to about 300 denier yarns in the machine direction. When calculating denier of yarns in the machine direction, both the under-yarn and the over-yarn are counted together; hence, a denier of 100 in the machine direction is in fact a 50 denier under-yarn together with a 50 denier over-yarn. It is most preferable to use 60 to 150 denier yarns in the over-under construction fabrics.

We prefer to space these yarns at yarn counts from about 3×3 to about 10×10 yarns per inch, and more preferably from 4×4 to 6×6, with a most preferable count being 6×4. (A pair of over-under machine direction yarns is considered as one yarn in these yarn count figures). The important factor is to have openings significantly larger than openings in the prior art lightweight mats, so that the bitumen on either side of the lightweight fabric 1 passes through the fabric and binds together well with bitumen on the other side of the fabric, creating greater inter-ply adhesion than found in the prior art.

In making the lightweight fabric of this invention, it is preferable to use large amounts of binder to insure that the binding of the over-under yarns is great enough to hold the fill direction yarns during processing. It is preferable to use binder in the amount of about 60 to about 250 parts by weight of binder measured as "dry weight pick-up" (the weight of the binder picked up by the fabric without counting the weight of the liquid used to dissolve or disperse the binder for purposes of application to the fabric) relative to 100 parts by weight of the polyester fabric to which it is applied. The most preferable range is about 100 to about 200 parts of binder, with the most preferable being about 150 pacts. Binders for the fabrics of this invention may be thermoplastic, for example a polyvinylchloride, or thermosetting, for example an acrylic.

As an example, using a lightweight open grid of over-under polyester scrim fabric with 150 denier yarns and a 6×4 yarn/inch construction, the spaces between the yarn are large enough for asphalt to form a strong bond through the scrim fabric and improve adhesion in the final roofing membrane product. In spite of this openness, however, this scrim fabric has sufficient surface area to process smoothly during manufacture of the roofing product without coming apart. Moreover, a high strength grid processed between it and a fiberglass mat does not pull out during the dipping and coating process in hot bituminous material or in later cooling stages. Based on experience with-prior art open grids held together by adhesive alone (without any mechanical connection at the crossover points), one would have expected this lightweight over-under construction grid to come apart and the high strength grid to come apart and/or pull out of the membrane during such processing.

The above examples are not intended to limit the scope of the invention, which should be given the full breadth encompassed by the description herein and the following claims.

What is claimed is:

1. A puncture resisting and processability improving composite for reinforcing bituminous roofing membranes that are free of organic mats, the composite consisting essentially of:

a lightweight open grid of over-under construction, in which yarns in the cross-machine direction are held between pairs of yarns in the machine direction lying essentially one above the other, said grid having polyester yarns of about 30 to about 300 denier in the machine direction and about 30 to about 300 denier in the cross-machine direction, a yarns per inch count of about 3×3 to about 10×10 in each of the machine and cross-machine directions, and a dry weight pick-up of about 60 to about 250 parts of an adhesive binder to 100 parts by weight of polyester in the grid, in which the adhesive, which is one of dissolved and dispersed in a liquid is applied to the composite so that the open grid is held together by the adhesive alone, and a high strength reinforcing fabric consisting essentially of a non-woven open grid of polyester having no mechanical connections at cross-over points in the grid, which is combined with the adhesively secured lightweight polyester open grid, said lightweight grid and said high strength reinforcing fabric being so arranged and constructed as to have sufficient binder and surface area to hold the composite and any additional reinforcements inside bituminous material of a roofing membrane during manufacture of the roofing membrane and to provide a roofing membrane that is free of any organic mat.

2. A composite according to claim 1, in which the lightweight open grid has no mechanical connection at cross-over points of the machine and cross-machine direction yarns.

3. A composite according to claim 1, in which the cross-machine direction yarns are held between pairs of machine direction yarns lying essentially one above the other.

4. A composite according to claim 3, in which upper machine direction yarns lie in one plane, lower machine direction yarns lie in a second plane and cross-machine direction yarns lie between upper and lower machine direction yarns in an intermediate plane.

5. A composite according to claim 3, in which wherever a cross-machine direction yarn crosses a pair of machine direction yarns, an upper machine direction yarn is above and a lower machine direction yarn is below the cross-machine direction yarns.

6. A composite according to claim 1, in which the adhesive binder is applied to the lightweight open grid in a sufficiently large amount to accumulate between the two yarns of each pair of machine direction yarns and to bind the machine direction yarns together and hold the cross-machine direction yarns between the pairs of machine direction yarns securely in subsequent processing.

7. A composite according to claim 1, in which the yarn per inch count of the lightweight polyester open grid is from about 4×4 to about 6×6.

8. A composite according to claim 1, in which the dry pick-up weight is about 100 to about 200 parts by weight of binder relative to 100 parts by weight of polyester in the lightweight open grid.

9. A composite according to claim 1, in which the yarn per inch count of the lightweight polyester open grid is 6×4, the dry pick-up weight is about 150 parts by weight of binder relative to 100 parts by weight of polyester in the lightweight open grid and the polyester yarns of the lightweight open grid have about 150 denier in the machine and cross-machine directions.

10. A puncture resisting and processability improving composite for reinforcing bituminous roofing membranes that are free of organic mats, the composite comprising:

a lightweight open grid of over-under construction, in which yarns in the cross-machine direction are held between pairs of yarns in the machine direction lying essentially one above the other, said grid having polyester yarns of about 30 to about 300 denier in the machine direction and about 30 to about 300 denier in the cross-machine direction, a yarns per inch count of about 3×3 to about 10×10 in each of the machine and cross-machine directions, and a dry weight pick-up of about 60 to about 250 parts of an adhesive binder to 100 parts by weight of polyester in the grid, in which the adhesive, which is one of dissolved and dispersed in a liquid is applied to the composite so that the open grid is held together by adhesive alone, and a high strength reinforcing fabric consisting essentially of a non-woven open grid of polyester having no mechanical connections at cross-over points in the grid, which is combined with the adhesively secured lightweight polyester open grid, said lightweight grid and said high strength reinforcing fabric being so arranged and constructed as to have sufficient binder and surface area to hold the composite and any additional reinforcements inside bituminous material of a roofing membrane during manufacture of the roofing membrane and to provide a roofing membrane that is free of any organic mat.

11. A composite according to claim 10, which consists essentially of the lightweight open grid of over-under construction, the high strength reinforcing fabric and another fabric layer.

12. A composite according to claim 10, in which the open grid has no mechanical connection at cross-over points of the machine and cross-machine direction yarns.

13. A composite according to claim 10, in which the cross-machine direction yarns are held between pairs of machine direction yarns lying essentially one above the other.

14. A composite according to claim 13, in which upper machine direction yarns lie in one plane, lower machine direction yarns lie in a second plane and cross-machine direction yarns lie between upper and lower machine direction yarns in an intermediate plane.

15. A composite according to claim 13, in which wherever a cross-machine direction yarn crosses a pair of machine direction yarns, an upper machine direction yarn is above and a lower machine direction yarn is below the cross-machine yarns.

16. A composite according to claim 10, in which the adhesive binder is applied to the lightweight open grid in a sufficiently large amount to accumulate between the two yarns of each pair of machine direction yarns and to bind the machine direction yarns together and hold the cross-machine direction yarns between the pairs of machine direction yarns securely in subsequent processing.

17. A composite according to claim 10, in which the yarn per inch count of the lightweight polyester open grid is from about 4×4 to about 6×6.

18. A composite according to claim 10, in which the dry pick-up weight is about 100 to about 200 parts by weight of binder relative to 100 parts by weight of polyester in the lightweight open grid.

19. A composite according to claim 10, in which the yarn per inch count of the lightweight polyester open grid is 6×4, the dry pick-up weight is about 150 parts by weight of binder relative to 100 parts by weight of polyester in the lightweight open grid and the polyester yarns of the lightweight open grid have about 150 denier in the machine and cross-machine directions.

20. A composite according to claim 10, in which the lightweight open grid of over-under construction and the high strength reinforcing fabric are laminated together.

* * * * *